US008000095B2

(12) United States Patent
Wang et al.

(10) Patent No.: US 8,000,095 B2
(45) Date of Patent: Aug. 16, 2011

(54) SLIDING MECHANISM AND ELECTRONIC DEVICE USING THE SAME

(75) Inventors: Keng-Ping Wang, Taipei (TW); Chin-Chang Meng, Taipei (TW); Chih-Ching Chen, Taipei (TW)

(73) Assignee: Asustek Computer Inc., Taipei (TW)

( * ) Notice: Subject to any disclaimer, the term of this patent is extended or adjusted under 35 U.S.C. 154(b) by 274 days.

(21) Appl. No.: 12/468,613

(22) Filed: May 19, 2009

(65) Prior Publication Data

US 2010/0027201 A1 Feb. 4, 2010

(30) Foreign Application Priority Data

Jul. 30, 2008 (TW) .............................. 97128808 A

(51) Int. Cl.
*G06F 1/16* (2006.01)
(52) U.S. Cl. ............. 361/679.3; 361/679.56; 455/575.1; 455/575.4
(58) Field of Classification Search ............... 361/679.3, 361/679.56
See application file for complete search history.

(56) References Cited

U.S. PATENT DOCUMENTS

| 6,975,889 | B2 * | 12/2005 | Chen et al. | 455/575.1 |
| 7,084,345 | B1 * | 8/2006 | Chen et al. | 174/545 |
| 7,869,840 | B2 * | 1/2011 | Kim et al. | 455/575.1 |
| 2007/0032278 | A1 * | 2/2007 | Lee et al. | 455/575.4 |
| 2007/0060220 | A1 * | 3/2007 | Hsu | 455/575.4 |
| 2007/0293283 | A1 * | 12/2007 | Inubushi et al. | 455/575.1 |
| 2008/0261659 | A1 * | 10/2008 | Jang et al. | 455/566 |
| 2009/0036181 | A1 * | 2/2009 | Lee | 455/575.4 |
| 2009/0149229 | A1 * | 6/2009 | Li et al. | 455/575.4 |
| 2009/0247248 | A1 * | 10/2009 | Ito | 455/575.4 |

FOREIGN PATENT DOCUMENTS

| CN | 1574861 A | 5/2004 |
| CN | 1719839 Y | 7/2005 |
| CN | 2812427 Y | 8/2006 |
| EP | 1480418 A1 | 11/2004 |

* cited by examiner

*Primary Examiner* — Jayprakash N Gandhi
*Assistant Examiner* — Anthony Q Edwards
(74) *Attorney, Agent, or Firm* — Tim Tingkang Xia; Morris, Manning & Martin, LLP

(57) ABSTRACT

The invention provides a sliding mechanism and an electronic device using the same. The sliding mechanism includes a bottom plate, a connection rod, a cover plate, an elastic member, and a connection member. Guiding sections are formed at two sides of the bottom plate, and the bottom plate has a first fastening hole and an arc-shaped groove. The connection rod has a first end and a second end. Sliding portions are formed at two sides of the cover plate to cooperate with the guiding sections to enable the cover plate to slide relative to the bottom plate, and the cover plate has a second fastening hole and a connection hole. The elastic member includes a third end and a fourth end. Furthermore, the connection member slidably fastens the fourth end of the elastic member and the second end of the connection rod to the arc-shaped groove through the connection hole.

20 Claims, 9 Drawing Sheets

SLIDING MECHANISM AND ELECTRONIC DEVICE USING THE SAME

BACKGROUND OF THE INVENTION

1. Field of the Invention

The invention relates to a sliding mechanism and, more particularly, to a sliding mechanism and an electronic device using the same.

2. Description of the Prior Art

The mobile communication device, such as a mobile phone, a personal digital assistant having a communication function, a handheld personal computer (HPC) and so on, has become a necessary communication/entertainment tool in modern life. In addition, the appearance of the mobile communication device has become more and more diversified to meet modern people's demands for new and change.

Taking mobile phones as an example, there are three types of the mobile phones, and they are a bar-type mobile phone, a slide-type mobile phone, and a flip-type mobile phone. The sizes of a screen and a keypad of a slide-type mobile phone are generally larger than the sizes of a screen and a keypad of a bar-type mobile phone, and the operation (such as receiving a call) of the slide-type mobile phone is more convenient than the operation of a flip-type mobile phone. Therefore, more and more manufacturers provide the slide-type mobile phones for consumers to select.

Generally, a slide-type mobile phone has two main body parts, and the two main body parts are connected with each other via a sliding mechanism. One of the main body parts is allowed to slide relative to the other main body part after suffering a force (such as a pushing force from a user). The sliding mechanism is the core structure of the slide-type mobile phone. Therefore, many researches and improvements in light of the sliding mechanism are provided at present.

A prior art discloses a sliding device including a bottom plate, an upper cover, and a spring. Sliding rails and a plurality of fastening holes are formed at two sides of the bottom plate, respectively, and a plurality of fastening holes and sliding grooves for receiving the sliding rails are formed at two sides of the upper cover, respectively. The spring is disposed between the bottom plate and the upper cover, one end of the spring is pivotally connected with a lateral surface of the bottom plate, and the other end is pivotally connected to the lateral surface of the upper cover which the bottom plate corresponds to. When an external force is exerted, the upper cover slides from a low end of the bottom plate to an upper end of the bottom plate along the sliding rails. Furthermore, when the deformation amount of the spring exceeds the critical point changing characteristics, the upper cover may continuously slide to one predetermined point of the upper end of the bottom plate under the elastic force of the spring.

However, after the sliding device is used for a period of time, with the loss of the elastic force, the direction-changing point may shift. Thus, the upper cover may slide back to the low end of the bottom plate in the opening process, may move to the upper end of the bottom plate in the closing process, or may stop at the middle of the bottom plate in the moving process, which may cause operation to be inconvenient.

In addition, to provide a preferred operating hand feeling, many complex sliding mechanisms are provided. Another prior art discloses a sliding structure improvement of a slide-type mobile phone. However, the sliding mechanism is complex, which results in high manufacturing cost and a high damaging rate.

SUMMARY OF THE INVENTION

The invention provides a sliding mechanism used at an electronic device to solve the problems in the prior art.

In an embodiment of the invention, the sliding mechanism of the invention includes a bottom plate, a connection rod, a cover plate, an elastic member, and a connection member.

The bottom plate has a first fastening hole and an arc-shaped groove. The connection rod has a first end and a second end, and the first end is pivotally connected with the first fastening hole.

The cover plate slides relative to the bottom plate, and the cover plate has a second fastening hole and a connection hole. The elastic member has a third end and a fourth end, and the third end is pivotally connected with the second fastening hole. In addition, the connection member slidably fastens the fourth end of the elastic member and the second end of the connection rod to the arc-shaped groove through the connection hole to enable the fourth end of the elastic member and the second end of the connection rod to slide along the arc-shaped groove.

The invention also provides an electronic device using the sliding mechanism to solve the problems in the prior art.

In an embodiment of the invention, the electronic device includes a first main body and a second main body. The first main body has a first main body surface, and the second main body has a second main body surface opposite to the first main body surface.

In addition, the electronic device further includes the sliding mechanism described above. The bottom plate is disposed on the first main body surface, and the bottom plate has a first fastening hole and an arc-shaped groove. The connection rod has a first end and a second end, and the first end is pivotally connected with the first fastening hole. The cover plate is disposed on the second main body surface, and it slides relative to the bottom plate to enable the second main body to slide relative to the first main body. Furthermore, the cover plate has a second fastening hole and a connection hole.

The elastic member has a third end and a fourth end, and the third end is pivotally connected and fastened to the second fastening hole. In addition, the connection member slidably fastens the fourth end of the elastic member and the second end of the connection rod to the arc-shaped groove through the connection hole to enable the fourth end of the elastic member and the second end of the connection rod to slide along the arc-shaped groove.

These and other features, aspects, and advantages of the present invention will become better understood with regard to the following description, appended claims, and accompanying drawings.

BRIEF DESCRIPTION OF THE APPENDED DRAWINGS

DETAILED DESCRIPTION OF THE INVENTION

The invention provides a sliding mechanism used at an electronic device.

Figure 1A:
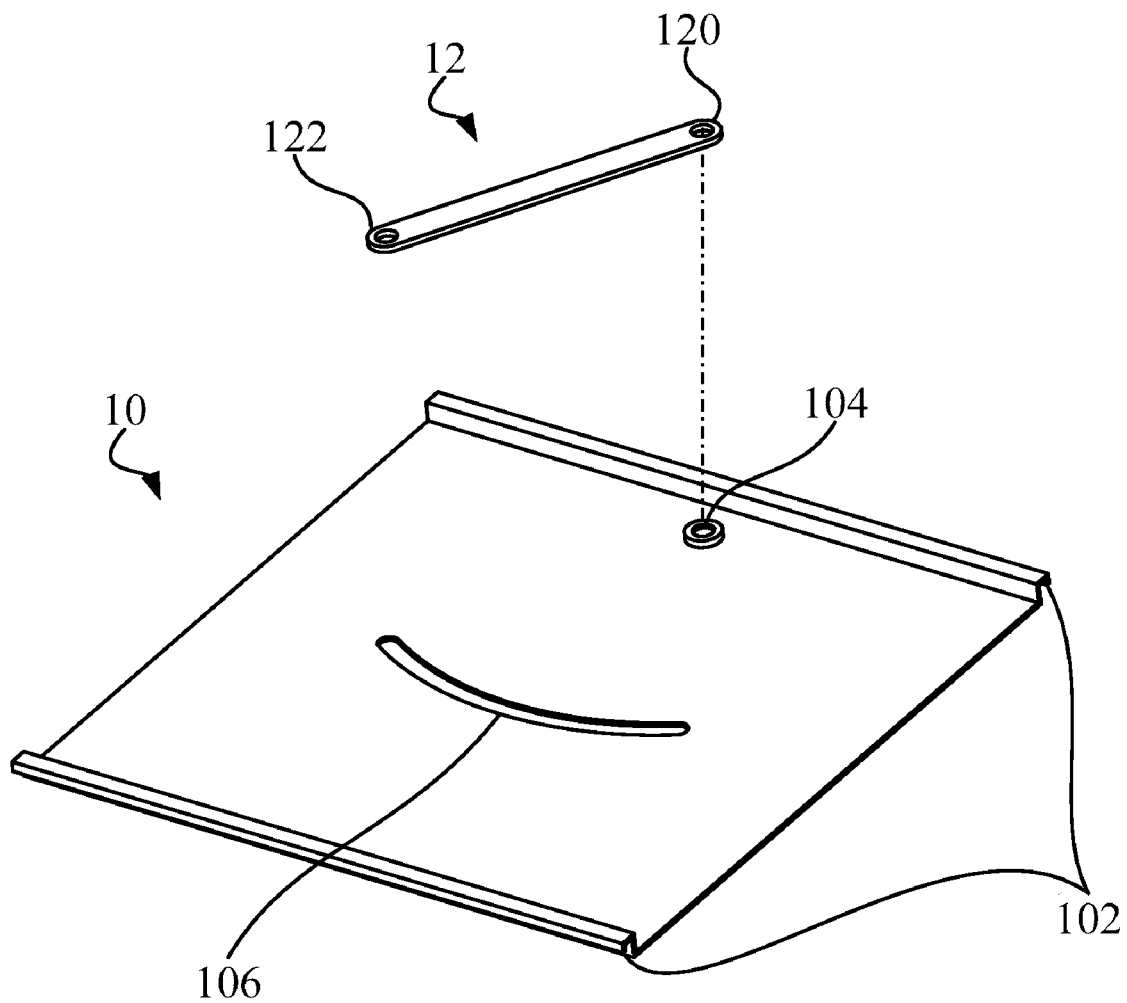
FIG. 1A is a schematic diagram showing a bottom plate and a connection rod of a sliding mechanism according to an embodiment of the invention.
Figure 1B:
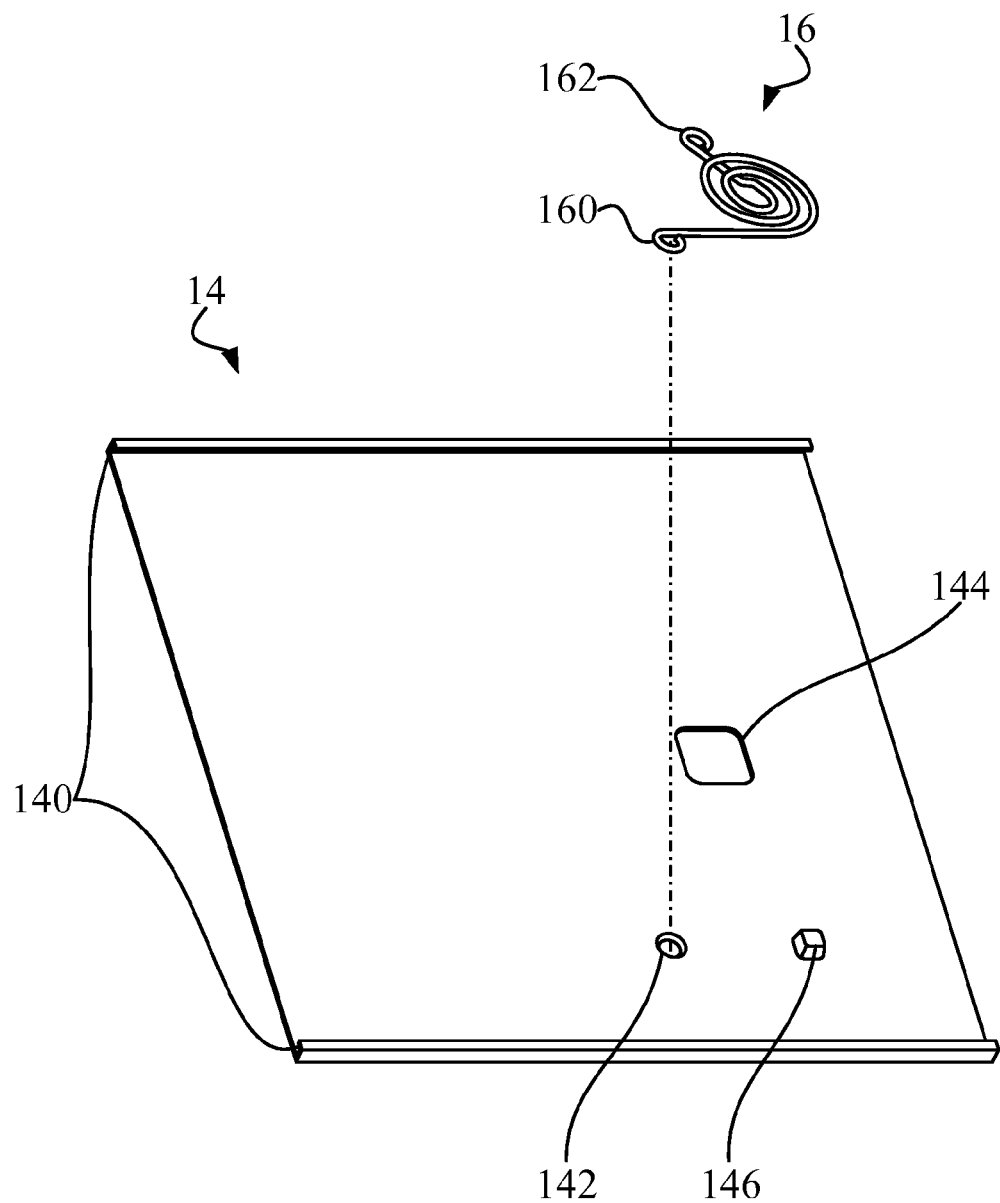
FIG. 1B is a schematic diagram showing a cover plate and an elastic member of a sliding mechanism according to an embodiment of the invention.
Figure 1C:
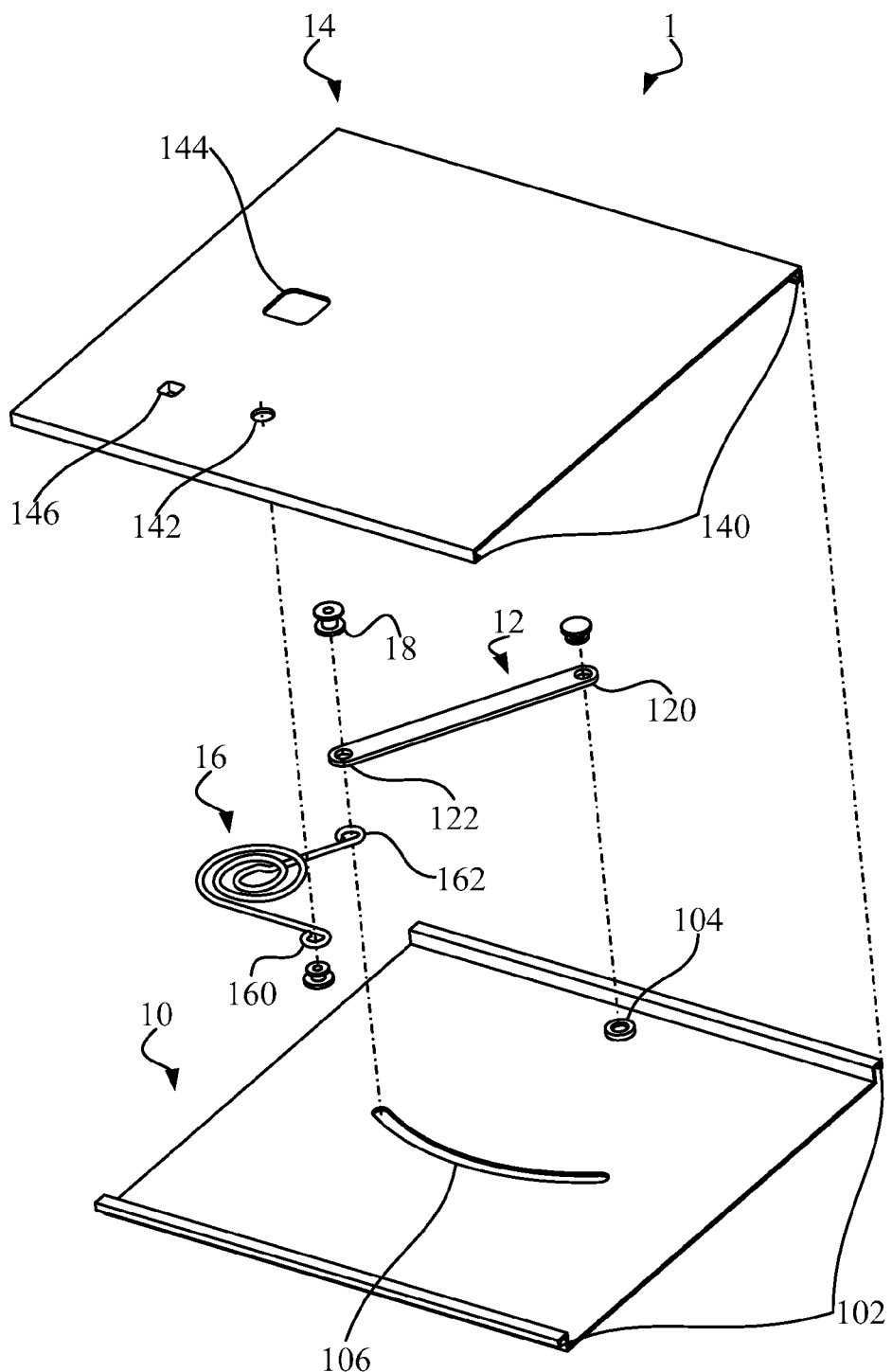
FIG. 1C is an exploded diagram of the sliding mechanism composed of the bottom plate and the connection rod in FIG. 1A and the cover plate and the elastic member in FIG. 1B.

As shown from FIG. 1A to FIG. 1C, FIG. 1A is a schematic diagram showing a bottom plate and a connection rod of a sliding mechanism according to an embodiment of the invention. FIG. 1B is a schematic diagram showing a cover plate and an elastic member of the sliding mechanism according to the embodiment of the invention. FIG. 1C is an exploded diagram of the sliding mechanism composed of the bottom plate and the connection rod in FIG. 1A and the cover plate and the elastic member in FIG. 1B.

As shown in FIG. 1A, a pair of guiding sections 102 are formed at two opposite sides of a bottom plate 10, and the bottom plate 10 has a first fastening hole 104 and an arc-shaped groove 106. Furthermore, a connection rod 12 has a first end 120 and a second end 122 opposite to each other, the first end 120 is pivotally connected and fastened to the first fastening hole 104, and the second end 122 is superposed upon the arc-shaped groove 106. In the embodiment, the first fastening hole 104 is located at the center of a virtual circle (not shown), and the arc-shaped groove 106 overlaps circumference of the virtual circle. Therefore, the connection rod 12 is the radius of the virtual circle. Thus, the second end 122 of the connection rod 12 is superposed upon any part of the arc-shaped groove 106.

As shown in FIG. 1B, a pair of sliding portions 140 are formed at two opposite sides of a cover plate 14, and the sliding portions 140 cooperates with the guiding sections 102 of the bottom plate 10 to enable the cover plate 14 to slide relative to the bottom plate 10. The cover plate 14 has a second fastening hole 142 and a connection hole 144. The elastic member 16 includes a third end 160 and a fourth end 162, the third end 160 is pivotally connected and fastened to the second fastening hole 142 of the cover plate 14, and the fourth end 162 is superposed upon the connection hole 144 of the cover plate 14. In addition, in the embodiment, the cover plate 14 further includes a stopping section 146 disposed protrudingly on the cover plate 14, and the stopping section 146 is used to stop the elastic member 16 and to enable the elastic member 16 to be compressed to generate deformation when the fourth end 162 of the elastic member 16 slides along the arc-shaped groove 106. In a practical application, the stopping section 146 may be formed on the cover plate 14 via a stamping process or in other modes.

As shown in FIG. 1C, when the sliding portions 140 of the cover plate 14 cooperate with the guiding sections 102 of the bottom plate 10 to slidably combine the cover plate 14 and the bottom plate 10, the cover plate 14 is superposed upon the bottom plate 10 to enable the connection hole 144, the fourth end 162 of the elastic member 16, the second end 122 of the connection rod 12 to overlap the arc-shaped groove 106. Therefore, the connection member 18 slidably fastens the fourth end 162 of the elastic member 16 and the second end 122 of the connection rod 12 to the arc-shaped groove 106 through the connection hole 144. Thus, the fourth end 162 of the elastic member 16 and the second end 122 of the connection rod 12 can slide along the arc-shaped groove 106.

As shown in FIG. 1C, in the embodiment, the connection member 18 is a rivet. In a practical application, the connection member may be another suitable member, which is not limited herein.

Figure 2A:
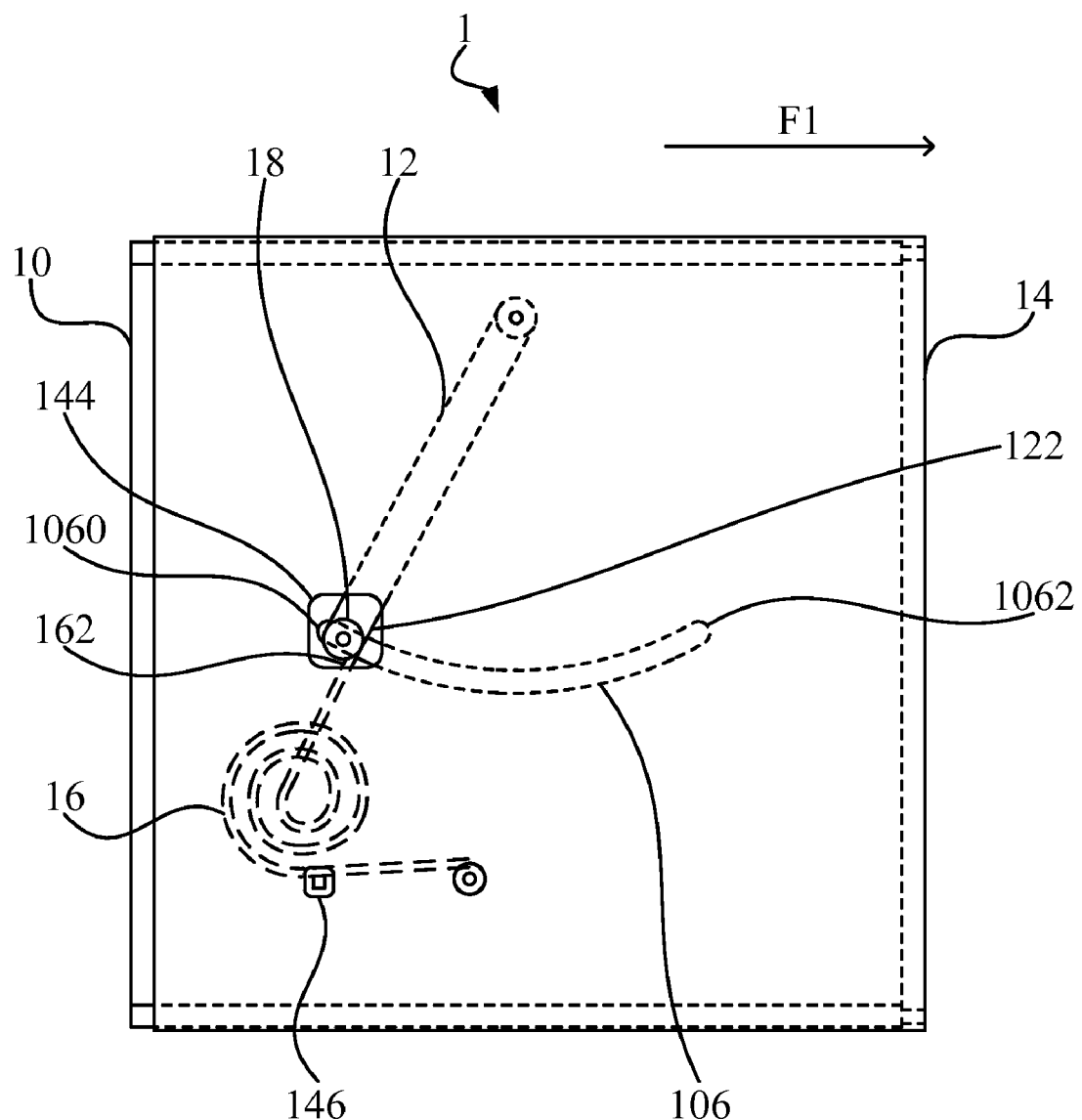
FIG. 2A to FIG. 2C are schematic diagrams showing operation of a sliding mechanism according to an embodiment of the invention.
Figure 2B:
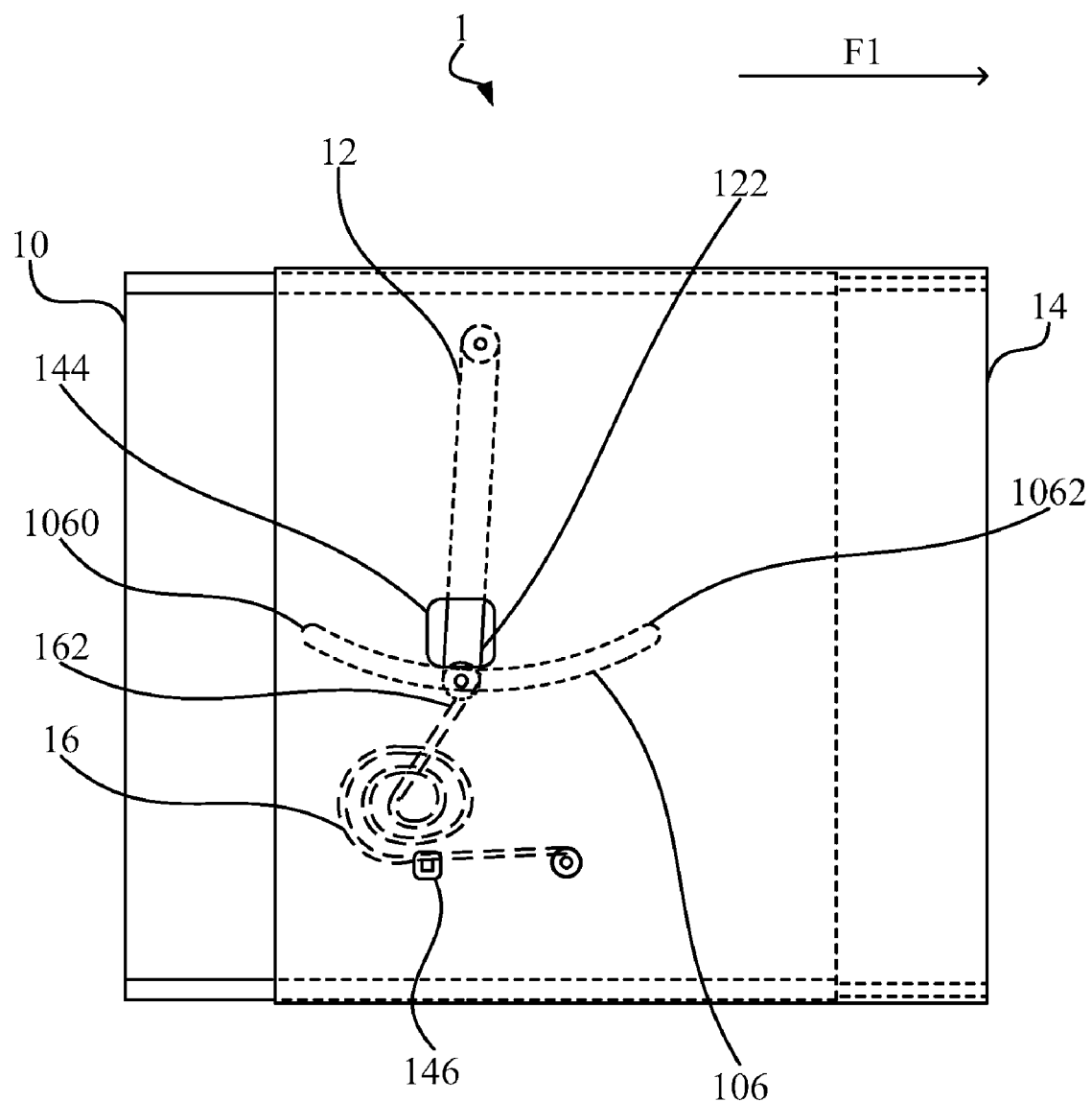
Figure 2C:
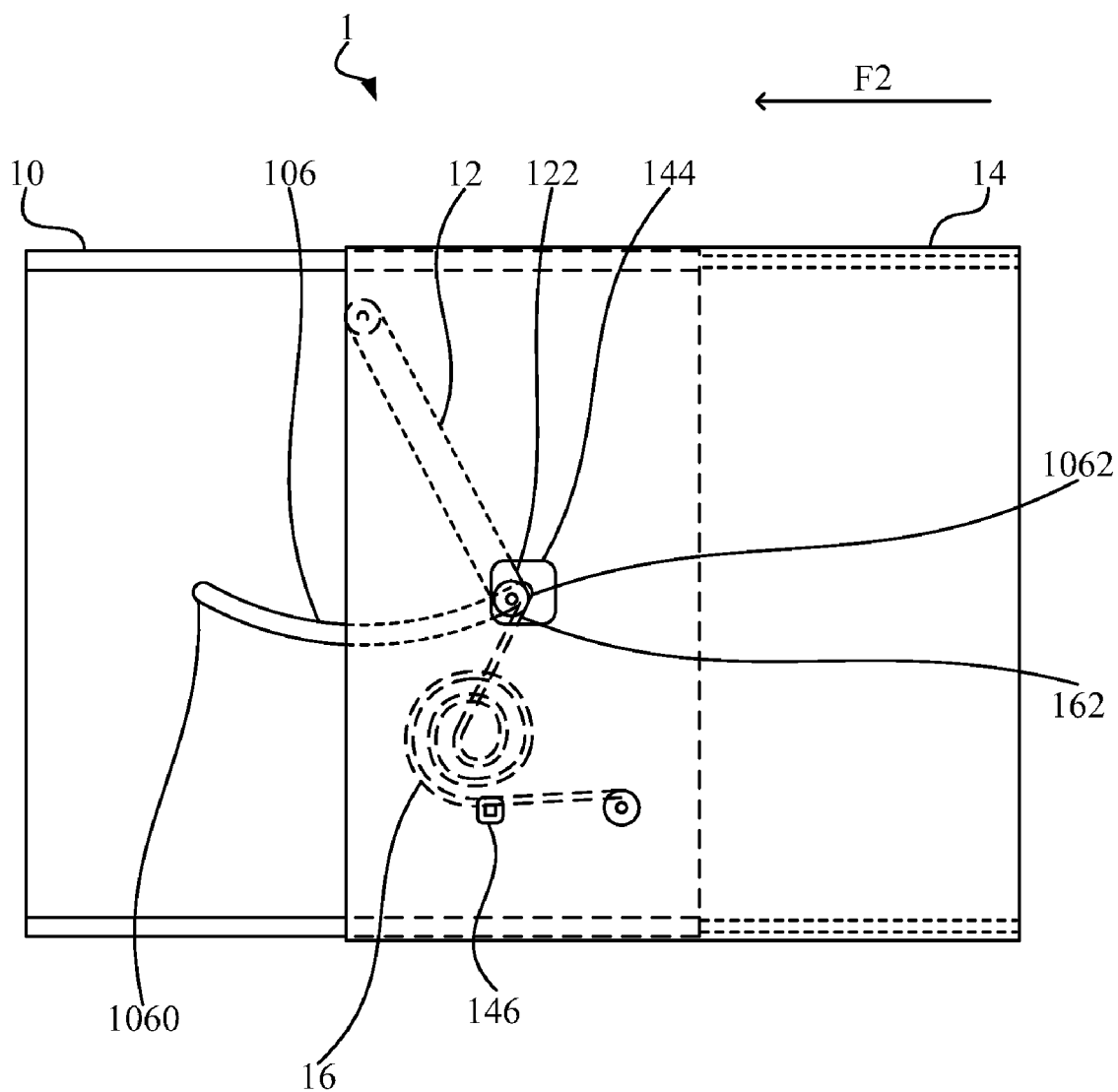

FIG. 2A to FIG. 2C are schematic diagrams showing operation of the sliding mechanism according to an embodiment of the invention. As shown from FIG. 2A to FIG. 2C, the arc-shaped groove 106 of the bottom plate 10 defines a fifth end 1060 and a sixth end 1062 opposite to each other.

When the cover plate 14 is substantially superposed upon the bottom plate 10, the fourth end 162 of the elastic member 16 and the second end 122 of the connection rod 12 are located at the fifth end 1060 of the arc-shaped groove 106. When a first external force is exerted on the cover plate 14 to enable the cover plate 14 to slide relative to the bottom plate 10 along a first stressing direction F1, the fourth end 162 of the elastic member 16 and the second end 122 of the connection rod 12 slide from the fifth end 1060 to sixth end 1062 along the arc-shaped groove 106.

When the fourth end 162 of the elastic member 16 and the second end 122 of the connection rod 12 slide to the middle area of the arc-shaped groove 106, the elastic member 16 suffers a largest pressure and the elastic member 16 has a largest compression amount. In the following process, the elastic member 16 gradually releases stored energy to drive the fourth end 162 of the elastic member 16 and the second end 122 of the connection rod 12 to slide from the middle area of the arc-shaped groove 106 to the sixth end 1062.

When the fourth end 162 of the elastic member 16 and the second end 122 of the connection rod 12 are located at the sixth end 1062 of the arc-shaped groove 106, and the cover plate 14 suffers a second external force to enable the cover plate 14 to slide relative to the bottom plate 10 along a second stressing direction F2 opposite to the first stressing direction F1, the fourth end 162 of the elastic member 16 and the second end 122 of the connection rod 12 slide from the sixth end 1062 to the fifth end 1060 along the arc-shaped groove 106.

In the same way, when the fourth end 162 of the elastic member 16 and the second end 122 of the connection rod 12 slide to the middle area of the arc-shaped groove 106, the elastic member 16 suffers the largest pressure, and the elastic member 16 has a largest compression amount. In the following process, the elastic member 16 gradually releases the stored energy to drive the fourth end 162 of the elastic member 16 and the second end 122 of the connection rod 12 to slide from the middle area of the arc-shaped groove 106 to the fifth end 1060.

In a practical application, when the arc-shaped groove 106 is unsymmetrical, the place where the elastic member 16 has the largest compression amount may not be the middle area of the arc-shaped groove 106. With the change of the place where the elastic member 16 is disposed, the place where the elastic member 16 has the largest compression amount may also change. Therefore, the designs and the changes of the shapes of the elastic member 16 and the arc-shaped groove 106 are in the scope of the invention, which is not limited herein.

As shown from FIG. 2A to FIG. 2C, in the embodiment, the elastic member is a torsional spring. However, in a practical application, the elastic member may be a linear spring, a spring with another shape, or an elastic body with the similar function. In the practical application, when the elastic member is a linear spring, the second fastening hole of the cover plate is substantially located at the center line of the arc-shaped groove. Thus, the linear spring has the largest compression amount when the fourth end of the linear spring and the second end of the connection rod slide to the middle area of the arc-shaped groove. In the practical application, the position of the second fastening hole may be determined according to demands, which is not limited herein.

The invention further provides an electronic device using the sliding mechanism described above. The electronic device may be, for example, a mobile phone, a personal digital assistant, a palmtop computer, and a positioning device (such as a GPS positioning device), which is not limited herein.

Figure 3A:
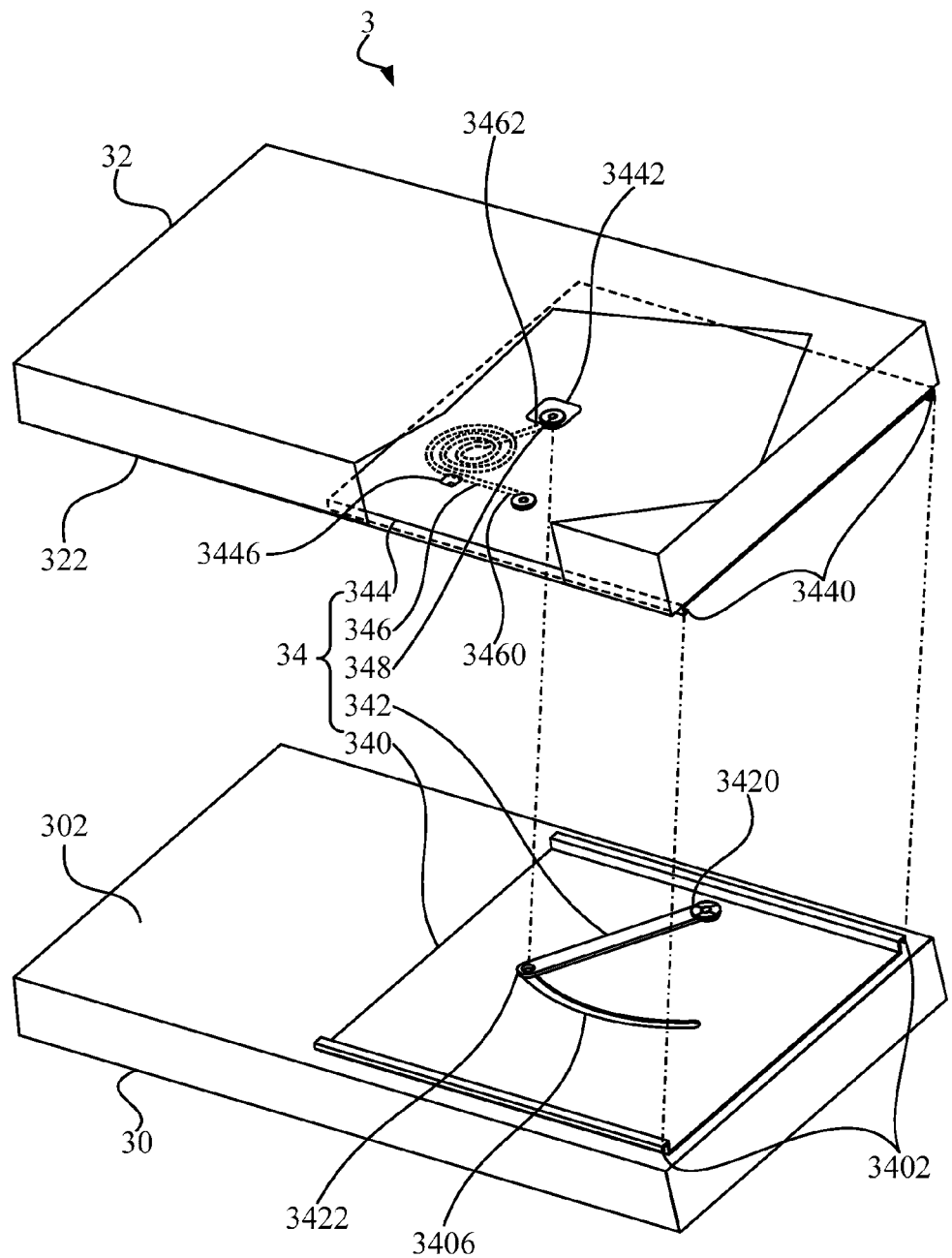
FIG. 3A is an exploded diagram of an electronic device according to an embodiment of the invention.
Figure 3B:
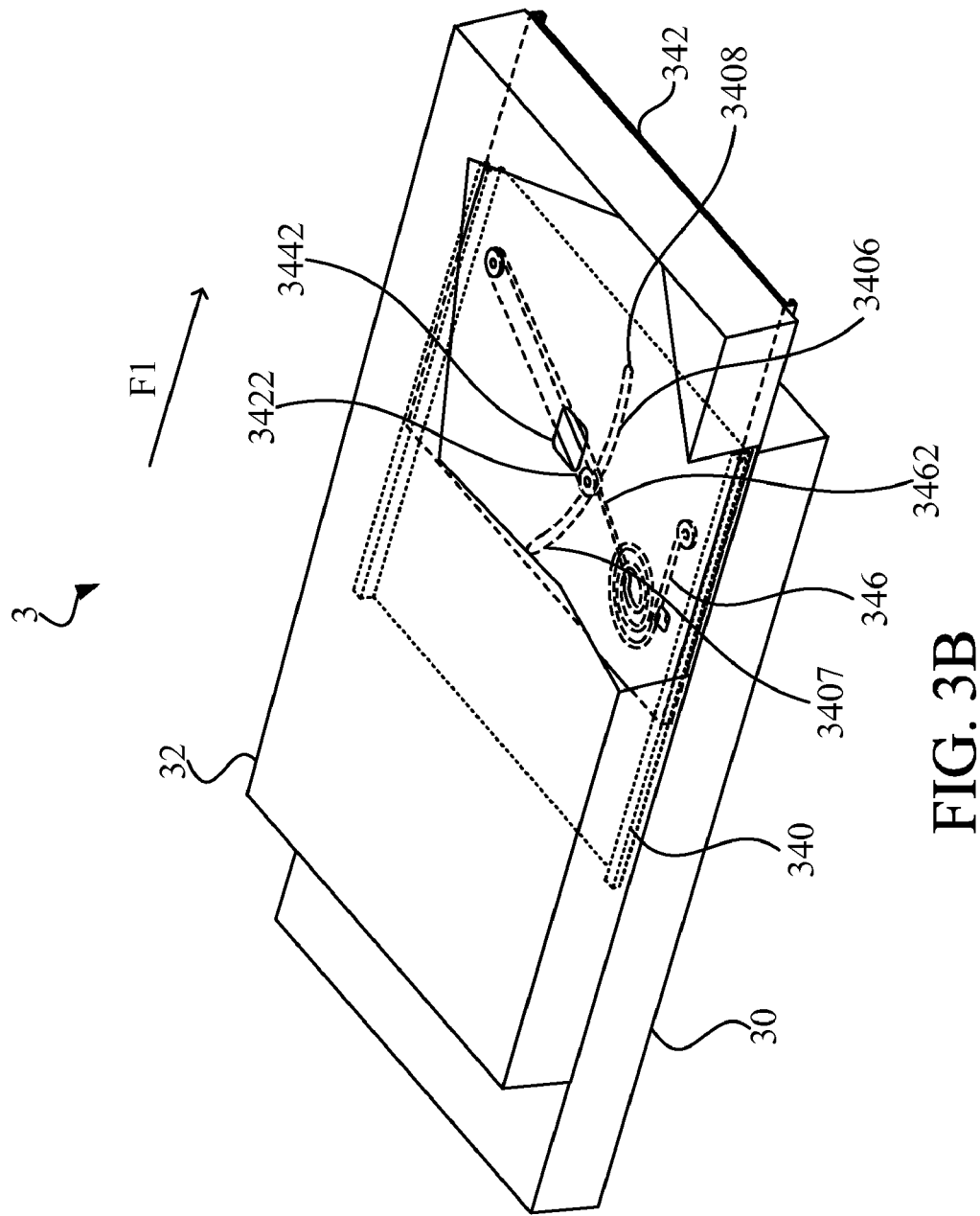
FIG. 3B and FIG. 3C are partial sectional diagrams of the electronic device in FIG. 3A.
Figure 3C:
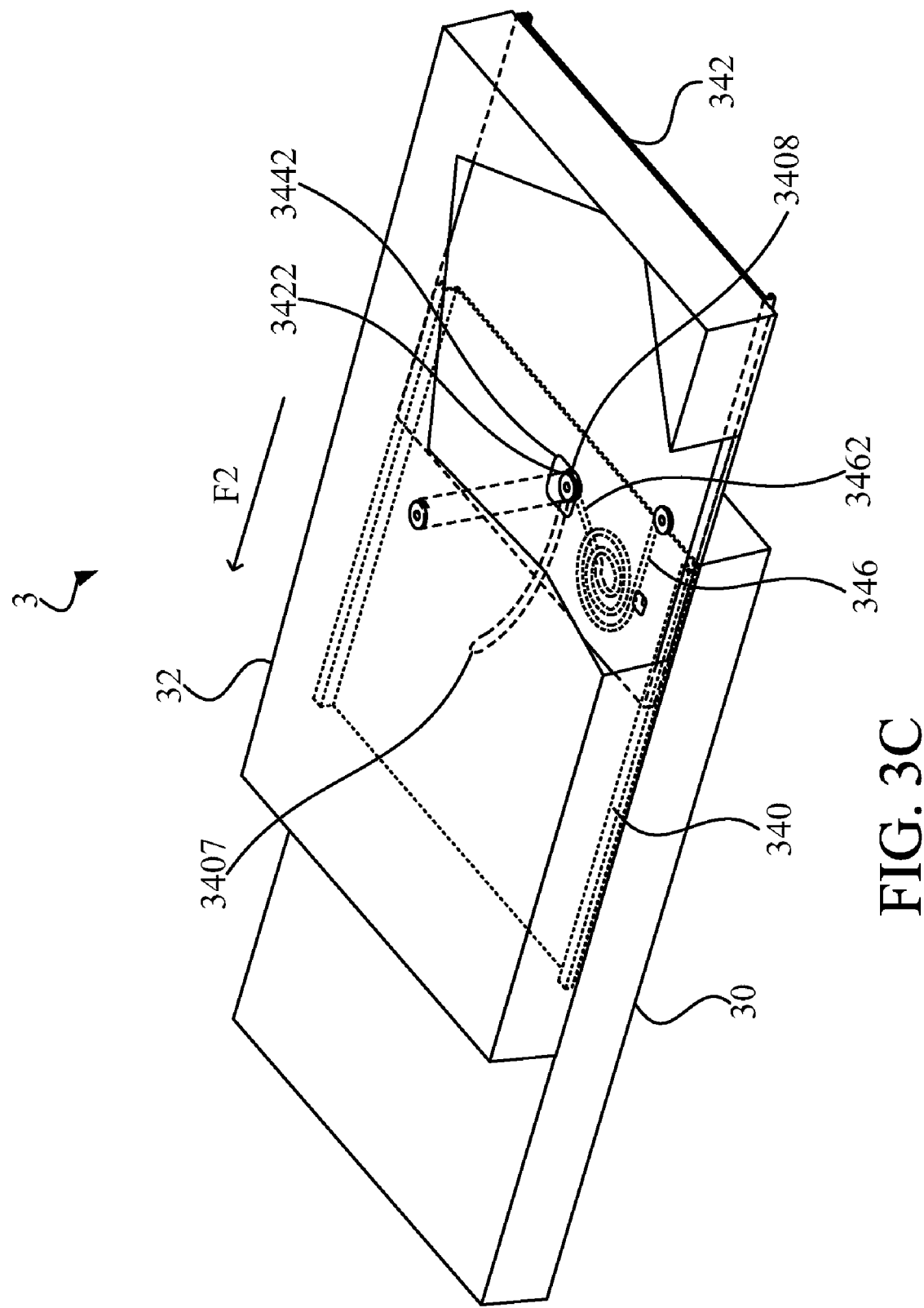

FIG. 3A is an exploded diagram of an electronic device according to an embodiment of the invention. FIG. 3B and FIG. 3C are partial sectional diagrams of the electronic device in FIG. 3A. As shown from FIG. 3A to FIG. 3C, an electronic device 3 includes a first main body 30, a second main body 32, and the sliding mechanism 34 described above. The first main body 30 has a first main body surface 302, and the second main body 32 has a second main body surface 322 opposite to the main body surface 302.

In a practical application, the first main body 30 and the second main body 32 may have a display module, a photographing module, and a keypad module, or other suitable operating modules and elements according to demands.

The bottom plate 340 of the sliding mechanism 34 is disposed on the first main body surface 302, a pair of guiding sections 3402 are formed at two opposite sides of the bottom plate 340, and the bottom plate 340 has a first fastening hole (not shown) and an arc-shaped groove 3406. The connection rod 342 of the sliding mechanism 34 has a first end 3420 and a second end 3422 opposite to each other, the first end 3420 is pivotally connected and fastened to the first fastening hole, and the second end 3422 is superposed upon the arc-shaped groove 3406.

The cover plate 344 of the sliding mechanism 34 is disposed on the second main body surface 322, and a pair of sliding portions 3440 are formed at two opposite sides of the cover plate 344. The sliding portions 3440 cooperates with the guiding sections 3402 of the bottom plate 340 to enable the cover plate 344 to slide relative to the bottom plate 340. The second main body 32 moves with the cover plate 344 to slide relative to the first main body 30. Furthermore, the cover plate 344 has a second fastening hole (not shown) and a connection hole 3442.

The elastic member 346 includes a third end 3460 and a fourth end 3462, the third end 3460 is pivotally connected and fastened to the second fastening hole, and the fourth end 3462 is superposed upon the connection hole 3442. The connection member 348 slidably fastens the fourth end 3462 of the elastic member 346 and the second end 3422 of the connection rod 342 to the arc-shaped groove 3406 through the connection hole 3442. Thus, the fourth end 3462 of the elastic member 346 and the second end 3422 of the connection rod 342 can slide along the arc-shaped groove 3406.

In the embodiment, the cover plate 344 further includes a stopping section 3446 disposed protrudingly on the cover plate 344, and the stopping section 3446 is used to stop the elastic member 346 and to enable the elastic member to be compressed to generate deformation when the fourth end 3462 of the elastic member 346 slides along the arc-shaped groove 3406. In a practical application, the stopping section 3446 may be formed on the cover plate 344 via a stamping process or in other modes.

The arc-shaped groove 3406 defines a fifth end 3407 and a sixth end 3408 opposite to each other. When the second main body 32 is superposed upon the first main body 30, the fourth end 3462 of the elastic member 346 and the second end 3422 of the connection rod 342 are located at the fifth end 3407 of the arc-shaped groove 3406. When an external force is exerted on the second main body 32 to enable the second main body 32 to slide relative to the first main body 30 along a first stressing direction F1, the fourth end 3462 of the elastic member 346 and the second end 3422 of the connection rod 342 slide from the fifth end 3407 to the sixth end 3408 along the arc-shaped groove 3406.

In the embodiment, in the same way, when the fourth end 3462 of the elastic member 346 and the second end 3422 of the connection rod 342 slide to the middle area of the arc-shaped groove 3406, the elastic member 346 suffers a largest pressure, and the elastic member 346 has a largest compression amount. In the following process, the elastic member 346 gradually releases the stored energy to drive the fourth end 3462 of the elastic member 346 and the second end 3422 of the connection rod 342 to slide from the middle area of the arc-shaped groove 3406 to the sixth end 3408.

When the fourth end 3462 of the elastic member 346 and the second end 3422 of the connection rod 342 are located at the sixth end 3408 of the arc-shaped groove 3406, and the second main body 32 suffers an external force to enable the second main body 32 to slide relative to the first main body 30 along a second stressing direction F2 opposite to the first stressing direction F1, the fourth end 3462 of the elastic member 346 and the second end 3422 of the connection rod 342 slide from the sixth end 3408 of the arc-shaped groove 3406 to the fifth end 3407 along the arc-shaped groove 3406.

In the same way, when the fourth end 3462 of the elastic member 346 and the second end 3422 of the connection rod 342 slide to the middle area of the arc-shaped groove 3406, the elastic member 346 suffers the largest pressure, and the elastic member 346 has the largest compression amount. In the following process, the elastic member 346 gradually releases the stored energy to drive the fourth end 3462 of the elastic member 346 and the second end 3422 of the connection rod 342 to slide from the middle area of the arc-shaped groove 3406 to the fifth end 3407.

In a practical application, when the arc-shaped groove 3406 is unsymmetrical, the place where the elastic member 346 has the largest compression amount may not be the middle area of the arc-shaped groove 3406. With the change of the place where the elastic member 346 is disposed, the place where the elastic member 346 has the largest compression amount may also change. Therefore, the designs and the changes of the shapes of the elastic member 346 and the arc-shaped groove 3406 are in the scope of the invention, which is not limited herein.

In the embodiment, the elastic member is a torsional spring. However, in a practical application, the elastic member may be a linear spring, a spring with another shape, or an elastic body with the similar function. In the practical application, when the elastic member is a linear spring, the second fastening hole of the cover plate is substantially located at the center line of the arc-shaped groove. Thus, the linear spring has the largest compression amount when the fourth end of the linear spring and the second end of the connection rod slide to the middle area of the arc-shaped groove. In the practical application, the position of the second fastening hole may be determined according to demands, which is not limited herein.

To sum up, the sliding mechanism and the electronic device using the same in the invention have the advantages such as a simple structure, convenient operation and so on. Furthermore, the sliding mechanism of the invention can prevent the upper cover from sliding back in an opening process or in a closing process with the loss of an elastic force, which avoids causing operation to be inconvenient.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A sliding mechanism used at an electronic device, the sliding mechanism comprising:
   a bottom plate having a first fastening hole and an arc-shaped groove;
   a connection rod having a first end and a second end, wherein the first end is pivotally connected with the first fastening hole;
   a cover plate sliding relative to the bottom plate and having a second fastening hole and a connection hole;
   an elastic member having a third end and a fourth end, wherein the third end is pivotally connected with the second fastening hole; and
   a connection member fastening the fourth end of the elastic member and the second end of the connection rod to the arc-shaped groove through the connection hole in a sliding mode.

2. The sliding mechanism according to claim 1, wherein a pair of guiding sections are formed at two opposite sides of the bottom plate, and a pair of sliding portions are formed at two opposite sides of the cover plate to cooperate with the guiding sections to enable the cover plate to slide relative to the bottom plate.

3. The sliding mechanism according to claim 1, wherein the arc-shaped groove has a fifth end and a sixth end, when the cover plate is superposed upon the bottom plate, the fourth end of the elastic member and the second end of the connection rod are located at the fifth end of the arc-shaped groove, and when a first external force is exerted on the cover plate to enable the cover plate to slide relative to the bottom plate along a first stressing direction, the fourth end of the elastic member and the second end of the connection rod slide from the fifth end to the sixth end along the arc-shaped groove.

4. The sliding mechanism according to claim 3, wherein when a second external force is exerted on the cover plate to enable the cover plate to slide relative to the bottom plate along a second stressing direction opposite to the first stressing direction, the fourth end of the elastic member and the second end of the connection rod slide from the sixth end to the fifth end along the arc-shaped groove.

5. The sliding mechanism according to claim 1, wherein the elastic member is a spring.

6. The sliding mechanism according to claim 5, wherein the spring is a linear spring, and the second fastening hole of the cover plate is located on a center line of the arc-shaped groove.

7. The sliding mechanism according to claim 5, wherein the spring is a torsional spring, and the cover plate further comprises:
   a stopping section, disposed protrudingly on the cover plate, for stopping the torsional spring and enabling the torsional spring to be compressed to generate deformation when the fourth end of the torsional spring slides along the arc-shaped groove.

8. The sliding mechanism according to claim 7, wherein the stopping section is formed via a stamping process.

9. The sliding mechanism according to claim 1, wherein the first fastening hole is located at the center of a virtual circle, and the arc-shaped groove overlaps circumference of the virtual circle.

10. The sliding mechanism according to claim 1, wherein the electronic device is one of the groups composed of a mobile phone, a personal digital assistant, a palmtop computer, and a positioning device.

11. An electronic device comprising:
    a first main body having a first main body surface;
    a second main body having a second main body surface opposite to the first main body surface;
    a bottom plate disposed on the first main body surface and having a first fastening hole and an arc-shaped groove;
    a connection rod having a first end and a second end, wherein the first end is pivotally connected with the first fastening hole;
    a cover plate disposed on the second main body surface, sliding relative to the bottom plate to make the second main body slide relative to the first main body, and having a second fastening hole and a connection hole;
    an elastic member having a third end and a fourth end, wherein the third end is pivotally connected with the second fastening hole; and
    a connection member fastening the fourth end of the elastic member and the second end of the connection rod to the arc-shaped groove through the connection hole in a sliding mode.

12. The electronic device according to claim 11, wherein a pair of guiding sections are formed at two opposite sides of the bottom plate, and a pair of sliding portions are formed at two opposite sides of the cover plate to cooperate with the guiding sections to enable the cover plate to slide relative to the bottom plate, and further to enable main body to slide relative to the first main body.

13. The electronic device according to claim 11, wherein the arc-shaped groove has a fifth end and a sixth end, when the second main body is superposed upon the first main body, the fourth end of the elastic member and the second end of the connection rod are located at the fifth end of the arc-shaped groove, and when a first external force is exerted on the second main body to enable the second main body to slide relative to the first main body along a first stressing direction, the fourth end of the elastic member and the second end of the connection rod slide from the fifth end to the sixth end along the arc-shaped groove.

14. The electronic device according to claim 13, wherein when a second external force is exerted on the second main body to enable the second main body to slide relative to the first main body along a second stressing direction opposite to the first stressing direction, the fourth end of the elastic member and the second end of the connection rod slide from the sixth end to the fifth end along the arc-shaped groove.

15. The electronic device according to claim 11, wherein the elastic member is a spring.

16. The electronic device according to claim 15, wherein the spring is a linear spring, and the second fastening hole of the cover plate is located on a center line of the arc-shaped groove.

17. The electronic device according to claim 15, wherein the spring is a torsional spring, and the cover plate further comprises:
    a stopping section, disposed protrudingly on the cover plate, for stopping the torsional spring and enabling the torsional spring to be compressed to generate deformation when the fourth end of the torsional spring slides along the arc-shaped groove.

18. The electronic device according to claim 17, wherein the stopping section is formed via a stamping process.

19. The electronic device according to claim 11, wherein the first fastening hole is located at the center of a virtual circle, and the arc-shaped groove overlaps circumference of the virtual circle.

20. The electronic device according to claim 11, wherein a first functional module is disposed on the first main body, a second functional module is disposed on the second main body, the first functional module comprises one of the groups composed of a display module, a photographing module and a keypad module, and the second functional module comprises one of the groups composed of a display module, a photographing module and a keypad module.

* * * * *